R. P. ROSS.
Valve-Cock.

No. 128,663. Patented July 2, 1872.

WITNESSES
Harry Smith
Thomas McIlvain

Robert P. Ross
by his Attys.
Stinson and Son

UNITED STATES PATENT OFFICE.

ROBERT P. ROSS, OF BETHLEHEM, PENNSYLVANIA.

IMPROVEMENT IN VALVE-COCKS.

Specification forming part of Letters Patent No. 128,663, dated July 2, 1872.

Specification describing an Improved Valve-Cock, invented by ROBERT P. ROSS, of Bethlehem, county of Northampton, State of Pennsylvania.

*Improved Valve-Cock.*

My invention consists of certain improvements in valve-cocks, too fully explained hereafter to need preliminary description; the main objects of the said improvements being to obtain tight joints, and to enable steam or other fluid under pressure to be cut off from the cock by means of a supplementary valve, during the repairing of the main valve, or renewing of the packing used in connection with the same.

Figure 1:
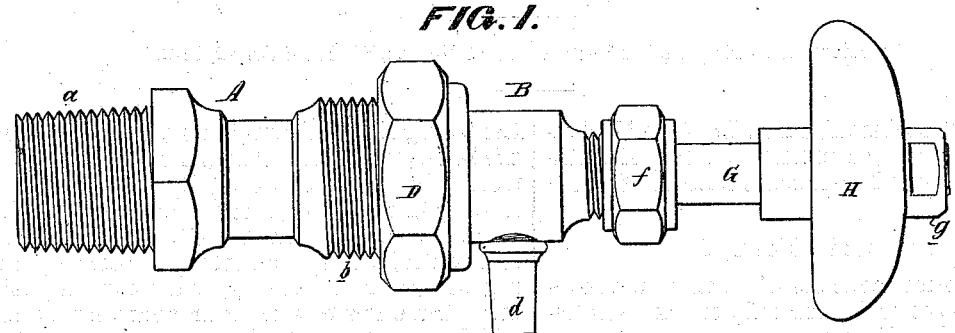
Figure 2:
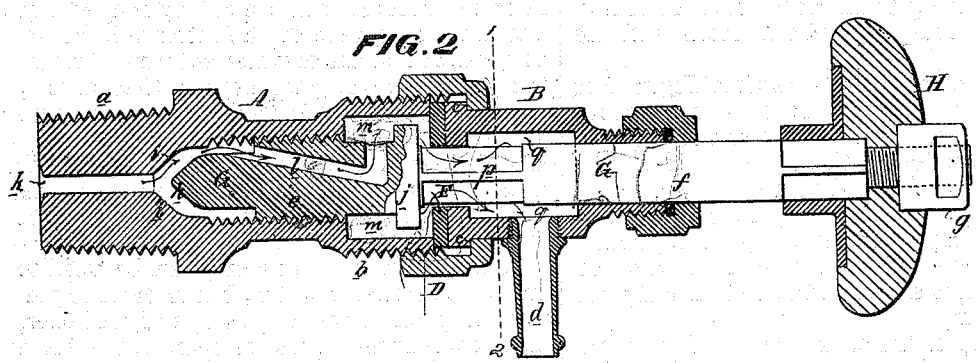
Figure 3:
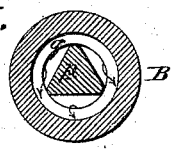

In the accompanying drawing, Figure 1 is an exterior view of my improved valve-cock; Fig. 2, a sectional view of the same; Fig. 3, a transverse section on the line 1 2, Fig. 2; and Fig. 4, a view of a modification.

My invention, although applicable to valve-cocks generally, has been designed especially for the gauge-cocks of steam-boilers, in which connection it is shown in the first three figures of the drawing.

The casing of the cock consists of two main parts, A and B, the former of which has screw-threads $a$ cut upon its outer end, to enable it to be screwed into the head of a boiler, as usual, and the two parts are connected together by a nut, D, adapted to screw-threads $b$, cut upon the exterior of the portion A and embracing the portion B, so that when screwed up the said nut shall bear against a shoulder, $c$, of the latter, and force the same against a disk, F, of rubber or other packing material, interposed between it and the inner end of the portion A of the casing. This forms a steam and water tight swivel-joint, and enables one portion of the casing to be turned upon the other to any extent desired without risk of leakage—an important feature in a gauge-cock, for it enables the portion A of the casing to be screwed into the boiler-head to its full extent, and the portion B, to which the outlet-nozzle $d$ is secured, to be afterward turned upon the same in order to direct the said nozzle downward, as shown. The threaded portion $e$ of the valve-stem G is adapted to corresponding internal threads of the casing A, and the said valve-stem extends outward through the casing B and through a stuffing-box, $f$, on the latter, and is furnished at its outer end with a suitable handle or wheel, H, which, after removing a nut, $g$, can be detached from the said stem. At the inner end of the stem there is a conical valve, $h$, adapted to a corresponding seat, $i$, in the casing, and upon the said stem there is also a circular disk-valve, $j$, for which the rubber disk F is made to serve as a seat. The distance between the two valves is considerably less than that between their seats, so that both cannot be in the latter at the same time; but by moving the valve-stem in or out, according as the valve $j$ or the valve $h$ is in its seat, both of the latter will be uncovered, and steam or water entering through the passage $k$ will pass around the valve $h$; thence through an opening, $l$, in the stem, into a chamber, $m$, in the casing A; and, finally, around the valve $j$, and around the squared or triangular portion $p$ of the stem into a chamber, $q$, of the casing B, which communicates with the outlet-nozzle $d$.

Either of the valves $h$ or $j$ can be used to cut off the steam or water; but in order to prevent all possibility of any escape of the latter, except when the valves are opened, the valve with its packed seat F, of rubber or other yielding material, is the one which it is intended shall be commonly used. This valve would effectually answer the purpose for which it is intended without the second valve, if it were not for the tendency which all packed joints have to become worn or leaky after a period of use, and for the difficulty which would be encountered, especially in a gauge-cock, whenever the packing had to be removed and renewed, as such change could only be made when the boiler was cold, the steam pressure removed, and the water below the level of the cocks. By the use of the second valve $h$, however, in connection with the packed valve, the latter can be repaired at any time, as, while operating upon the same the steam or water can be cut off by the valve $h$, which is then screwed into its seat.

The method of removing the worn packing F, and of replacing it by a new piece after the closing of the valve $h$, is as follows: The nut $g$ is first unscrewed, and the handle H removed from the outer end of the valve-stem, after which the connecting-nut D for the two sections of the casing is unscrewed, which will permit the casing B, with the packing that is to be removed, to be slipped over and withdrawn from the valve-stem. After thus removing the old packing, a new piece is slipped onto the valve-stem and pushed over the same in advance of the casing B until it is confined between the latter and the casing A, in which position it is clamped by the nut D, serving, as before described, to prevent leakage between the two portions of the casing, as well as around the valve $j$.

Figure 4:
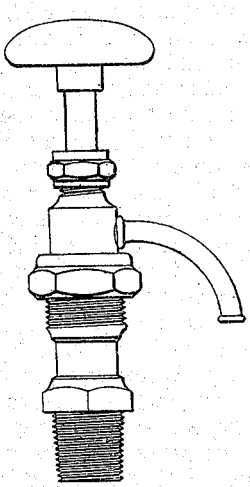

My invention, although intended especially for gauge-cocks, can be arranged in an upright position, and be furnished with a curved nozzle, as shown in Fig. 4, so as to render it available as a basin or other cock.

It is essential in carrying out my invention that the valves $h$ and $j$ should both be arranged between the points at which the steam or water is admitted and discharged, and I prefer that the said valves should both be upon the same stem, as described, although this is not essential, as they could be operated independently.

I claim as my invention—

1. The combination, with a gauge or other cock, of two valves arranged within the casing between the inlet and outlet passages, so that the steam or other fluid may be cut off by either, all substantially as and for the purpose specified.

2. The combination of the portion A, the swiveling portion B, the packing F confined between the two, and the valve $j$ having its seat on the said packing, as set forth.

In testimony whereof I have signed my name to this specification in the presence of two subscribing witnesses.

ROBERT P. ROSS.

Witnesses:
FRANCIS CASSIDY,
ROBERT WRIGHT.